Figure 1:
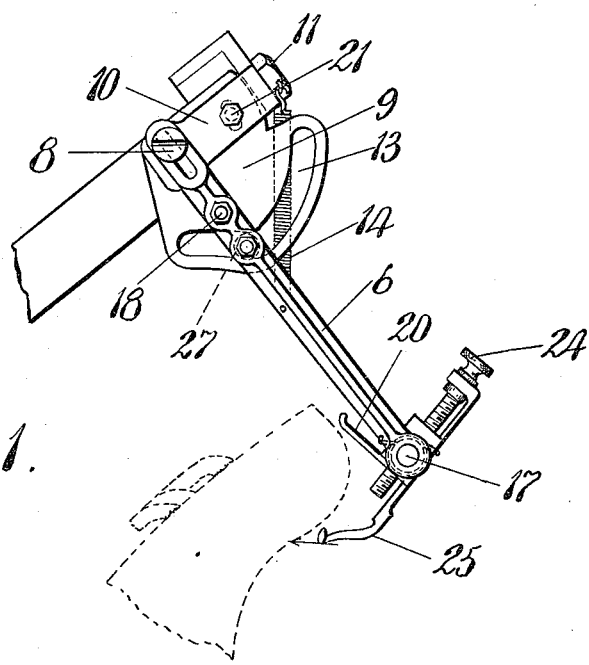

J. TRIEM.
TIP MEASURING APPARATUS FOR PULLING-OVER MACHINES.
APPLICATION FILED OCT. 17, 1913.

1,142,128.

Patented June 8, 1915.

WITNESSES.

INVENTOR.

UNITED STATES PATENT OFFICE.

JAKOB TRIEM, OF FRANKFORT-ON-THE-MAIN, GERMANY, ASSIGNOR TO UNITED SHOE MACHINERY COMPANY, OF PATERSON, NEW JERSEY, A CORPORATION OF NEW JERSEY.

TIP-MEASURING APPARATUS FOR PULLING-OVER MACHINES.

1,142,128.

Specification of Letters Patent. Patented June 8, 1915.

Application filed October 17, 1913. Serial No. 795,803.

*To all whom it may concern:*

Be it known that I, JAKOB TRIEM, a subject of the King of Bavaria, residing at Frankfort-on-the-Main, in the Kingdom of Prussia and Empire of Germany, have invented certain Improvements in Tip-Measuring Apparatus for Pulling-Over Machines, of which the following description, in connection with the accompanying drawings, is a specification, like reference characters on the drawings indicating like parts in the several figures.

This invention relates to apparatus for use in making shoes and particularly to improvements in tip measuring apparatus for pulling-over machines.

In the use of tip measuring apparatus which travel in the path of a circle when swung from an inoperative position into a position to locate the toe tip of a shoe, difficulty has been experienced because the measuring gages interfere with the toe of the shoe before they are correctly positioned thereon, this being particularly true when operating upon high toed shoes. If the apparatus were permitted a larger radius of movement to bring it into operative position so as to avoid this condition it would not position itself correctly on the various sizes of shoes.

An object of the present invention is to provide in a tip measuring apparatus means to control the path of movement of the apparatus into operative position in such a manner that the gages avoid interference with the toe of the shoe and are positioned correctly thereon regardless of the size or style of the shoe. The means herein shown comprise two cam plates arranged to allow the apparatus to move in a predetermined path, which is preferably in the path of an arc, for a sufficient distance to avoid interference with the toe of a shoe and thereafter in a path in the direction of the center of the said arc during continued movement into tip measuring position on the shoe. Conveniently the cams are adjustable to predetermine the time at which the change of direction shall take place to insure the correct position of the device relatively to the particular size or style of shoe.

The several features of the invention will be apparent from the following description of an illustrated embodiment thereof and will be pointed out in the claims.

Figure 2:
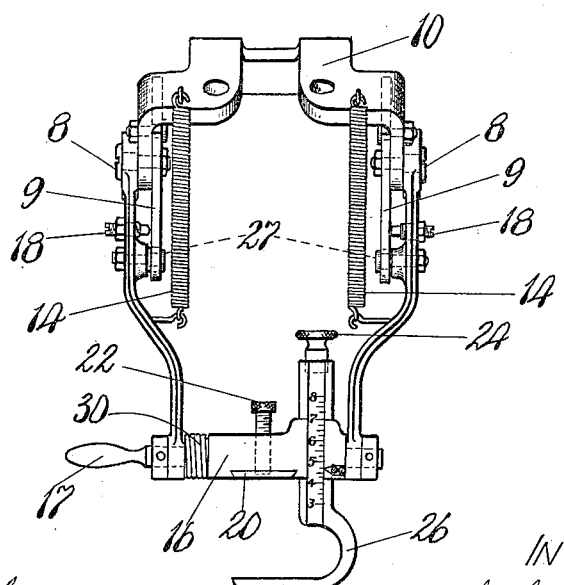

In the drawings: Figure 1 is a side elevation of a tip measuring apparatus of the present invention. Fig. 2 is a front elevation thereof.

In the illustrated embodiment of the invention the tip measuring apparatus is of substantially the same construction as that shown and described in United States Letters Patent No. 1,097,324, dated May 19, 1914, and includes a bracket 10 attached to the frame of a pulling-over machine of the type shown in United States Letters Patent No. 1,029,387, dated June 11, 1912, at 11. This bracket movably supports the measuring members by a pair of parallel links 6 and tension springs 14 normally uphold the links and the parts carried by them in inoperative position. The bar 16 which connects the lower ends of the links 6 extends beyond the links at one end to form a handle 17 and carries the toe abutment plate 20 which is clamped in adjusted position on said bar 16 by a thumb screw 22. On the front face of the bar 16 and extending at right angles to the plate 20 is located the measuring plate 26 which is adjustable lengthwise by the screw 24 threaded into the bar. A spiral spring 30 on the bar permits a limited turning movement of the bar 16 about its axis.

In accordance with this invention two cam plates 9 having duplicate angular cam slots 13 are connected by pivot pins 8 to the bracket 10 and can be turned about the pins and held in adjusted position by the screws 21. The links 6 have a slot connection with the pins 8 of the bracket to allow them to move both around and in a radial direction on said pins and each link is provided with a cam roll 27 which is received in the respective cam slots 13 of the plates 9. Adjustable guide pins 18 which are carried by the link 6 rest against the plates 9 and serve to steady the links 6 when the device is turned about the pivot pins 8.

It will be noted that as the device is swung down from its inoperative position against the tension of the springs 14 by the handle 17 its path of movement is controlled by the cam slots 13 in the plates 9 which slots, as shown in Fig. 1, confine the device to travel preferably in the path of an arc for a portion of its movement and thereafter to approach the center of said arc during its continued movement into measuring position on the shoe. By reason of the adjustment of the cam plates 9 by the screws 21 the time at which the change of movement takes place is predetermined and this movement is preferably after the measuring gages will have cleared the toe of the shoe or are in no danger of contacting therewith and are in a position in which the last movement given to it will bring the gages in a proper position for the particular shoe.

Having thus described the invention, what is claimed as new and desired to be secured by Letters Patent of the United States is:—

1. Apparatus of the class described having, in combination, supporting means, a tip measuring device mounted to turn and also to slide thereon in moving from inoperative position around the toe of a shoe to operative position, and cam plates against which said device is guided and which are adjustable to guide the device in different paths appropriate for shoe toes of different shapes.

2. Apparatus of the class described having, in combination, a tip measurer supported for movement into tip measuring position, said measurer comprising members for engaging the toe end of the shoe and for overlying the tip of the shoe, and cam plates coöperating with said measurer to cause it to move in an arc for a predetermined distance while it travels around the end of the shoe toe and thereafter to approach the center of said arc during continued movement into tip measuring relation to the shoe.

3. Apparatus of the class described having, in combination, supporting means, a tip measuring device movably mounted thereon, and means controlling the direction of movement of said device relatively to its support from an inoperative position around the toe of a shoe to operative position in a path other than a continuous arc, said controlling means comprising a cam and means yieldingly holding the measuring device to follow the path provided by the cam.

4. Apparatus of the class described having, in combination, supporting means, a tip measuring device movably mounted thereon, and means controlling the direction of movement of said device relatively to its support from an inoperative position around the toe of a shoe to operative position in a path other than a continuous arc, said controlling means being adjustable to produce paths of movement adapted to different shapes of shoe toes.

5. Apparatus of the class described having, in combination, supporting means, a tip measuring device movably mounted thereon, and means controlling the direction of movement of said device relatively to its support from an inoperative position around the toe of a shoe to operative position constantly around one center but in a path other than a continuous arc.

6. Apparatus of the class described having, in combination, pulling-over means, a tip measurer mounted for movement at the will of an operator into tip measuring position on the shoe, said measurer comprising a holder bar and a measuring plate, maintaining substantially constant relation to each other during use, and means to cause said measurer to travel in a substantially circular path for a predetermined distance and thereafter at an angle to said path when swung into tip measuring relation to the shoe.

7. A machine of the class described having, in combination, pulling-over means, and a tip measuring device, said device comprising a holder bar and a measuring plate, maintaining substantially constant relation to each other during use and constructed and arranged to be movable into operative position along a certain path for a predetermined distance and thereafter in a path at an angle to said first mentioned path into operative position on the shoe.

In testimony whereof I have signed my name to this specification in the presence of two subscribing witnesses.

JAKOB TRIEM.

Witnesses:
   Dorothea Cover,
   Wallace Ellison.

Copies of this patent may be obtained for five cents each, by addressing the "Commissioner of Patents, Washington, D. C."